US005562245A

United States Patent [19]

Berthelemy et al.

[11] Patent Number: 5,562,245

[45] Date of Patent: Oct. 8, 1996

[54] METHOD OF PRODUCING A CIRCULAR FIBRE-REINFORCED METAL ARTICLE, AND APPARATUS FOR USE IN SAID METHOD

[75] Inventors: Jean-Claude Berthelemy, Mennecy; Gilles J. Bessenay, Paris; Gérard P. Gauthier, Saint Michel sur Orge; Daniel G. Girault, Melun; Ludovic E. C. Molliex, Paris, all of France

[73] Assignee: Societe Nationale d'Etude et de Construction de Moteurs d'Aviation "Snecma", Paris, France

[21] Appl. No.: 351,703

[22] Filed: Dec. 8, 1994

[30] Foreign Application Priority Data

Dec. 8, 1993 [FR] France .................................. 93 14698

[51] Int. Cl.[6] ............................ B23K 20/00; B21K 3/00

[52] U.S. Cl. .......................... 228/190; 228/174; 228/265

[58] Field of Search .................................. 228/121, 165, 228/174, 190, 203, 247, 265

[56] References Cited

U.S. PATENT DOCUMENTS

| | | | |
|---|---|---|---|
| 4,012,824 | 3/1977 | Dawihl et al. | 27/419.1 |
| 4,572,271 | 2/1986 | Nakashima et al. | 228/190 |
| 5,184,769 | 2/1993 | Moracz et al. | 228/121 |
| 5,213,252 | 5/1993 | Eylon | 228/265 |
| 5,337,940 | 8/1994 | Woods et al. | 228/190 |

FOREIGN PATENT DOCUMENTS

| | | |
|---|---|---|
| 0409629A2 | 6/1992 | European Pat. Off. . |
| 2186353 | 1/1974 | France . |
| 2366904 | 5/1978 | France . |
| 2607071 | 5/1988 | France . |

*Primary Examiner*—Samuel M. Heinrich
*Attorney, Agent, or Firm*—Oblon, Spivak, McClelland, Maier & Neustadt, P.C.

[57] ABSTRACT

A method of producing a circular metal article reinforced by fibres in selected parts of its cross-section is described in which a metal blank of the article is formed and provided with at least one annular groove opening in the axial direction, preforms of reinforcing fibre and filler metal are placed in the groove which is then closed by a metal plug, and the assembly is isothermally forged to produce the article in a single forging step which serves to compress the preforms, weld the assembly together, and shape the article. Such articles may be used for machining high performance rotors for turbojet engines. Apparatus for use in the method is also described.

15 Claims, 2 Drawing Sheets

METHOD OF PRODUCING A CIRCULAR FIBRE-REINFORCED METAL ARTICLE, AND APPARATUS FOR USE IN SAID METHOD

BACKGROUND OF THE INVENTION

1. Field of the Invention

The invention relates to a method of producing, using an isothermal forging process, circular metal articles reinforced internally by fibres over one or more selected parts of their cross-section. The invention also relates to isothermal forging apparatus, and to apparatus for use in making reinforcing fibre preforms which are used in the method.

The circular articles produced by the method are intended for use, inter alia, in the production of high strength-to-weight ratio rotors, such as the rotors of turbomachines for aircraft.

2. Summary of the Prior Art

The rotors of turbomachines are generally symmetrical about their rotational axis and have on their periphery or their side a plurality of blades serving as either compressor blades or turbine blades. These rotors usually rotate at high speed and experience severe stresses, due mainly to centrifugal force but also to vibrations of the machine and the accidental intake of foreign bodies. The design of such rotors is a compromise between aerodynamic or hydrodynamic performance, strength and weight.

In endeavours to improve the strength-to-weight ratio it is known to reinforce the rotors by rings or bands made of stronger materials and having a higher modulus of elasticity, also known as Young's modulus.

Rotor reinforcing rings are known which have a fibrous structure, particularly of fibres of silicon carbide, boron carbide or other high-strength material, the fibres being embedded in a metal matrix. French patent No. 2607071 describes one example in which silicon carbide (SIC) fibres are assembled as a helical ribbon or preform, and another ribbon made of the material of the matrix is interleaved between the turns of the silicon carbide fibre ribbon. The assembly is pressed at high temperature, and the pressure forces diffuse the matrix material between the fibres to give cohesion to the assembly.

In another embodiment preforms are used which are each formed by a single fibre wound in a flat spiral. This ensures excellent regularity of the radius of curvature of the fibre for enhanced strength of the ring.

The fibre can be held in position before pressing by radial strips or filaments extending alternately below and above the fibres to be held, as in the case of the yarns of a woven fabric. This solution is difficult to carry out and has the further disadvantage of making the fibres wavy and thus reducing their ability to withstand a tensile force.

To avoid this drawback European patent No. 0490629 proposes forming a spiral groove in a strip of the same material as the matrix, placing the fibre in the groove and holding the fibre in position by spraying on an organic binder or a plasma of the matrix metal to provide a preform containing both fibre and matrix metal. This solution does not have the disadvantage of making the fibres wavy, but is expensive and difficult to carry into effect because the grooves into which the fibre has to be introduced are very narrow. The ring is then produced by hot compression of the preform at a high enough temperature and pressure for the metal to penetrate between the fibres and be welded around them. If an organic binder is used, this is destroyed by pyrolysis during the temperature rise, leaving only minimal carbon residues.

Rotors can be reinforced with such rings by mechanical assembly of the ring on the rotor, in which assembly there are bound to be gaps. The ring therefore becomes effective only when the rotor is sufficiently deformed to close the gaps.

The rings can also be banded around the rotors. This arrangement provides excellent cohesion between the ring and the rotor but has the disadvantage of subjecting the ring to tensile prestressing, which reduces its ability to retain the rotor. Also, the rotor geometry must be adapted to receive the ring.

Reinforcing rings can also be slid onto the rotor periphery or introduced into grooves machined in the rotors, then brazed or welded thereto by any means. This solution provides excellent cohesion between the ring and the remainder of the rotor, but has the disadvantage of subjecting the fibres to two heat cycles, so that their degradation is increased. For example, silicon carbide (SIC), which is often used for making reinforcing fibres, may react with the metal of the matrix at high temperature. To reduce this reaction the fibres may be covered by a carbon layer, but this diffuses into the matrix metal and alters the metallurgical structure of the matrix. The reaction of the fibre material with the matrix is therefore merely delayed.

The advanced process of isothermal forging is also known wherein the article is heated in a vacuum chamber or in a controlled atmosphere to a temperature at which the metal can be deformed superplastically, the article is placed in a former heated to the same temperature, and a continuous pressure is applied to the article. This process leads to an outstanding and very homogeneous metallurgical structure of the article. It also enables the article blank to be made in a number of parts which are welded together during the forging.

SUMMARY OF THE INVENTION

According to the invention, there is provided a method of producing a circular, fibre-reinforced metal article, comprising the steps of:

- making a metal blank of said article;
- forming at least one annular groove in said blank, said annular groove having an axis and being open at least in the direction of said axis;
- making preforms of fibre and filler metal;
- placing said preforms into said annular groove; and isothermally forging said blank and said preforms to produce the said article in a single isothermal forging step wherein said preforms are compressed, the compressed preforms are welded to the blank, and the article is shaped.

Spaces remaining between the preforms and the walls of the annular groove when the preforms are placed in the groove may be filled with powder, preferably powdered filler metal, which is weldable to the metal of the blank and to the filler metal.

Preferably, the filler metal and the powder have isothermal forging temperatures near or slightly below that of the metal of the blank.

Preferably the groove is closed by a cover or plug which makes contact with the preforms in the groove and extends beyond the groove. Since the isothermal forging proceeds axially, the cover makes it possible to start off the isothermal forging step by compression of the preforms, the cover preferably being made of a material which has an isothermal forging temperature near or slightly above that of the filler metal and which is weldable to the metal of the blank and the filler metal.

Preferably the isothermal forging is performed in an axial direction and is combined with radial isothermal forging in order to obtain a substantially isostatic compression—i.e., a compression which is homogeneous in all directions. Isostatic compression makes the welding of the fibrous zone to the remainder of the article more homogeneous. The radial forging can be effected by centrifugal pressure applied to the inner side of the article.

The isothermal forging may be carried out using apparatus comprising an annular former having an L-section whose opening faces outwards, a band of a material having a low coefficient of thermal expansion extending around the former, an expansible mandrel disposed inwardly of the central part of the former, and an annular plunger which fits between the vertical wall of the L-shaped former and the band to effect forging of the article.

Preferably fibre preforms and filler metal preforms are made separately from each other, each in the shape of a flat ring, and are stacked alternately in the annular groove so that each metal preform separates two fibre preforms.

The fibre preforms are preferably in the form of single-layer spirals and may be made by coating a fibre with an organic binder, hardening the coating, and winding the coated fibre on a former in a spiral of contiguous turns in a single flat radial layer.

The coating is hardened just enough to prevent it from being crushed during winding. The contiguous turns are therefore stuck together during winding under the tension of the fibre, so that the preform is coherent after leaving the winding former.

The fibre preform may be produced economically by means of an apparatus comprising a fibre feed bobbin, a tank containing a binder solution, means for drying the coated fibre, such as a tube heated by an electrical resistance, and a winding former having two flat parallel cheeks spaced apart from one another by a distance equal to or slightly greater than the diameter of the coated fibre.

The method in accordance with the invention should not be confused with methods of producing reinforcing rings, such as that described in the aforementioned French patent No. 2607071. The method of the invention consists of incorporating fibrous reinforcing structures in articles while reserving material to provide the functions of the article, then compressing the fibrous structures within the article during the forging thereof. French patent No. 2607071, on the other hand, is limited to the preparation of all-fibre pieces which then have to be fitted to the articles to be reinforced.

Compared with the production of separate rings, such as in French patent No. 2607071, the method in accordance with the invention therefore has the advantage of performing in a single thermal cycle the compression of the preforms and the intimate connection, similar to welding, of the fibre-reinforced zone to the rest of the material of the article. The avoidance of an extra heat cycle reduces the stressing of the reinforcing fibres and lowers the production cost of the articles.

The method also offers a wide range in the choice of zones to be reinforced, which may be in various parts of the cross-section of the article such as the centre, the periphery or the flanks. The material of the article is distributed according to the intended purpose of the article. For example, in the case of an axial-flow turbomachine rotor, material is provided on the periphery for the machining of the blades and on the flanks for machining flanges for connecting the rotor to other stages of the turbomachine and also, for example, for machining labyrinth sealing means or grooves for the fixing of balance weights.

The process is economical too, since it obviates one heat cycle and also the need for accurate machining of the reinforcing ring and the groove for receiving the ring in the article. Production of the preforms is also very simple.

One embodiment of the invention as applied to the production of a turbomachine rotor having blades will now be described, by way of example only, with reference to the accompanying drawings.

DESCRIPTION OF THE PREFERRED EMBODIMENT

Figure 1:
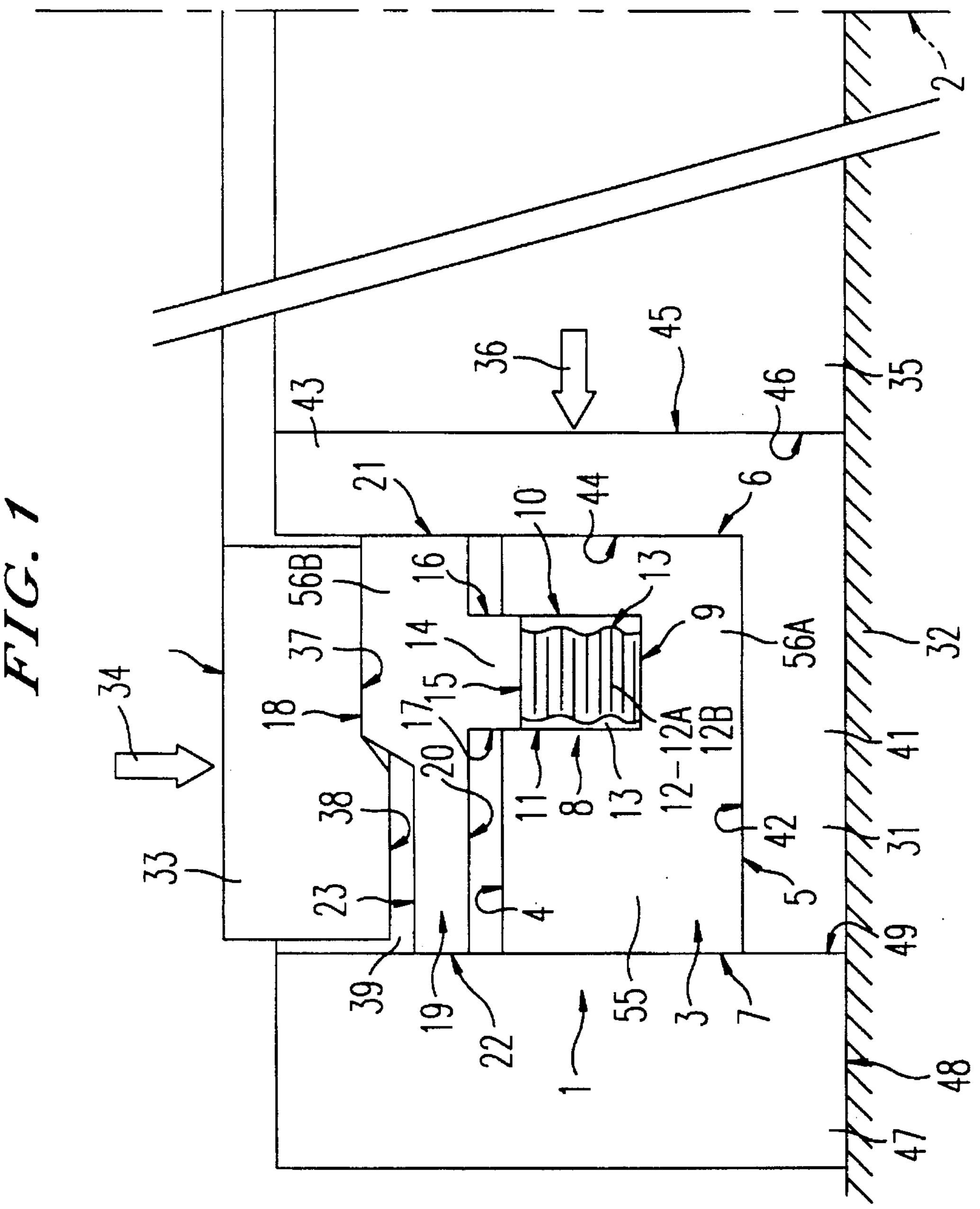
FIG. 1 is a sectional view of the rotor blank and preforms disposed in the isothermal forging former ready for forging.

The rotor is machined from a ring 1 which is generally symmetrical about its geometric axis 2 and which is produced by the following steps 1 to 7, the rotor being machined in step 8.

1) Formation of an annular blank 3 around the axis 2, the blank 3 being bounded axially by two flanks 4, 5 and radially by an inner surface 6 of revolution and an outer surface 7 of revolution.

2) Forming at least one annular groove 8 coaxial with the axis 2 in one or both of the flanks 4 or 5 of the blank 3. In the preferred, lower-cost embodiment disclosed, a single annular groove 8 is formed in one flank 4. The groove 8 has a substantially U-shaped cross-section and opens in the flank 4 in a direction parallel to the axis 2. The groove 8 has a circular base 9 which is flat and radial to the axis 2, and cylindrical inner and outer walls 10 and 11 which are coaxial with the axis 2 and extend from the base 9 to the flank 4 to define the opening of the groove 8. The groove 8 thus defines an annular space in the blank 3 which will subsequently receive the reinforcing fibres, and also provides access to the space for the placing therein of the fibres and the filler metal.

If it was required to place the reinforcing fibres around the periphery of the article, the groove 8 would have an L-shaped section opening radially and axially.

3) Making fibre and filler metal preforms 12 which are rigid enough for them to be transportable to the forging position and placed in the groove 8. The preforms 12 may each contain both fibre and filler metal, or the preforms 12 may be of two different kinds, one kind 12A containing fibre and the other kind 12B containing filler metal. The preforms 12 are in the shape of flat annular discs having substantially the dimensions of the groove 8.

4) Placing the preforms 12 into the groove 8. If the preforms 12 are of different kinds, the fibre preforms 12A and the filler metal preforms 12B are introduced alternately, each metal preform 12B separating two fibre preforms 12A.

5) Filling any spaces 13 between the preforms 12 and the groove walls 10, 11 with filler metal in powder form. This helps to fill the spaces 13 better during the pressing and isothermal shaping, and hence to improve the continuity between the ring material in the fibrous zone and the material outside this zone.

6) Formation and placement of a plug 14 in the groove 8 to close the groove 8. The plug 14 has an end 15 which comes into contact with the preforms 12 under gravity, and preferably the plug 14 projects from the groove 8 so that the step of isothermally forging the ring is commenced by a phase in which the fibre and filler metal preforms 12 are compressed.

The plug 14 is in the form of a ring which is coaxial with the axis 2 and has a flat circular end 15 extending radially with respect to the axis 2. The plug end 15 is adjacent an inner cylindrical wall 16 whose diameter is slightly greater than that of the groove wall 10, and adjacent an outer cylindrical wall 17 whose diameter is slightly less than that of the groove wall 11, so that the plug 14 can fit into the groove 8 with adequate clearance. The plug 14 is also bounded axially by a surface 18 opposite the end 15. The surface 18 may be circular, flat and radial with respect to the axis 2, but could have a different shape depending on the profile of the ring 1 and the desired deformation of the metal during forging.

Preferably, the part of the plug outside the groove 8 has a radially projecting portion 19 which is bounded axially by the plug surface 18 opposite the end 15 and by a surface 20 which is opposite the flank 4 of the blank 3 and is of complementary shape to the flank 4. The portion 19 is bounded radially relatively to the axis 2 by an inner cylindrical surface 21 in line with the blank surface 6 and by an outer cylindrical surface 22 in line with the blank surface 7.

After forging, the surface 18 will become the second flank of the ring 1 and will be disposed opposite the flank 5.

When the plug 14 is initially placed on the preforms 12 the flank 4 and the surface 20 are spaced from one another to enable the preforms 12 to be compressed.

The surface 18 is also formed with a circular depression 23 extending out to the outer surface 22 for enabling metal to be extruded radially during the forging step.

7) Heating and isothermal forging of the blank 3 with the preforms 12 in the groove 8 and the plug 14 closing the groove.

The blank 3 is placed on its flank 5 in a former 31 disposed on the bottom plate 32 of a hydraulic press. A plunger 33 penetrates into the former and transmits to the plug surface 18 the pressure 34 which is applied parallel to the axis 2 by the top plate (not shown) of the press.

In a first phase the pressure 34 presses the plug end 15 against the preforms 12 and causes the filler metal to be extruded and agglomerated between the fibres of the preforms. As the filler metal fills the gaps between the fibres the total height of the preforms decreases and the plug 14 penetrates into the groove 8 until the surface 20 of the portion 19 makes contact with the flank 4 of the blank 3. The pressure 34 is then operative axially on all of the material of the ring 1, which gradually takes up the shape imposed by the former 31 and the plunger 33. In practice the plug 14 starts to be deformed before complete compression of the preforms 12.

Under the action of the pressure 34 the metal of the blank 3, the filler metal in powder form introduced into the spaces 13 and the filler metal of the preforms 12 finish completely filling the gaps between the fibres, make contact with one another and become welded together, so that the fibres and metal are compressed during the isothermal forging of the ring.

It is preferred to use a filler metal having an isothermal forging temperature near or slightly below that of the metal of the blank in order to enhance the brazing and the plasticity of the filler metal and thus facilitate penetration of the metal between the fibres. The filler metal must of course be weldable to the metal of the article. Advantageously the metals of the article, the preforms and the powder may be identical, but this is not essential.

Preferably, the metal of the plug 14 has an isothermal forging temperature near or above the forging temperature of the metal of the blank 3 and of the filler metal of the preforms 12 so as to be slightly less plastic than they are in order to improve the pressing of the preforms 12 against the base of the groove 8 and in particular to initiate compression of the preforms 12 before the isothermal forging proper of the ring 1.

In another embodiment the metals of the blank 3 and plug 14, the filler metal of the preforms 12 and the metal of the powder are identical, a feature which improves the homogeneity and strength of the resulting ring 1.

Advantageously, means 35 apply to the blank 3 a radial pressure 36 which combines with the axial pressure 34 in order to produce an isostatic pressure in the article—i.e., a pressure which is uniform in all directions. This isostatic pressure improves the welding of the metal of the blank 3 and plug 4 around the preforms 12 and helps to reduce the quantity of powdered filler metal required to be introduced into the spaces 13, so that the ring 1 is made more homogeneous.

The plunger 33 bears on the plug 14 through its surface 37. This surface has a stepped portion 38 which is of the same shape as the depression 23 but whose height is less than the depth of the depression 23.

Consequently a gap 38 is left between the stepped portion 38 and the depression 23 which is filled during isothermal forging by the radial displacement of the plug material 14 near the surface 18 in contact with the plunger 33. This displacement of material imparts to the metal grains an elongate shape, called fibering, which increases their strength.

As already described, the apparatus for isothermally forging the ring 1 comprises a former 31 disposed on the bottom plate 32 of a press, a plunger 33 to which the top plate (not shown) of the press applies an axial pressure 34 and which penetrates into the former 31, and means 35 which applies centrifugal pressure 36 to the former 31.

Preferably, the former 31 has an annular shape around the axis 2, having an L-shaped cross-section with the opening facing upwards and outwards. The horizontal arm 41 of the L is at the bottom and its top surface serves as the base 42 of the former 31. The vertical arm 43 of the L is at the end of the horizontal arm 42 nearer the axis 2 and forms the vertical wall 44 of the former. On the opposite side of the arm 43 from the wall 44, the former 31 is bounded by a concave cylindrical surface 45 facing towards and coaxial with the axis 2.

Advantageously, the means 35 for applying the centrifugal pressure 36 to the former 31 takes the form of a radially expanding mandrel made of a material having a high coefficient of thermal expansion, the expansion of the mandrel being produced by heating the mandrel. The latter is bounded in the radially outward direction by a cylindrical surface 46 which fits inside the cylindrical surface 45 of the wall 44 with a reduced clearance between the surfaces 45 and 46. Clearly, when the mandrel 35 expands as a result of being heated, its surface 46 exerts a thrust on the surface 45 of the former 31 to produce the centrifugal pressure 36.

The apparatus also comprises a cylindrical band 47 which is centred on the axis 2 and rests with one of its end faces 48 on the bottom press plate 32. The band 47 has an inner concave cylindrical wall 49 which is centred on the axis 2 and extends around the former 31, the wall 49 facing the vertical wall 44 and defining the radially outward limit of the space in which the ring 1 is forged. The annular plunger 33 fits between the wall 44 and the band wall 49.

The band 47 is made of a strong material having a low coefficient of thermal expansion, such as carbon fibres. The band 47 prevents radial expansion of the blank 3 and plug 14 during the isothermal forging, thus enhancing the effectiveness of the centrifugal pressure 36 while retaining the fibres to prevent stressing thereof.

In this example the rotor is made of TA6V titanium alloy and the reinforcing fibres are made of silicon carbide, SiC, coated with a carbon deposit. Isothermal forging is performed at 950° C. at a pressure of 600 bar for 50 minutes.

Final machining of the rotor from the ring 1 thus produced. In the case of an axial turbomachine rotor the blades (not shown) are machined from the portion 55 of the ring between the preforms 12 and the outer surface 7, whereas the flanges (not shown) for connection to the other stages of the turbomachine are machined from the portions 56A and 56B disposed between the preforms 12 and the flanks 5 and 18 respectively.

Figure 2:
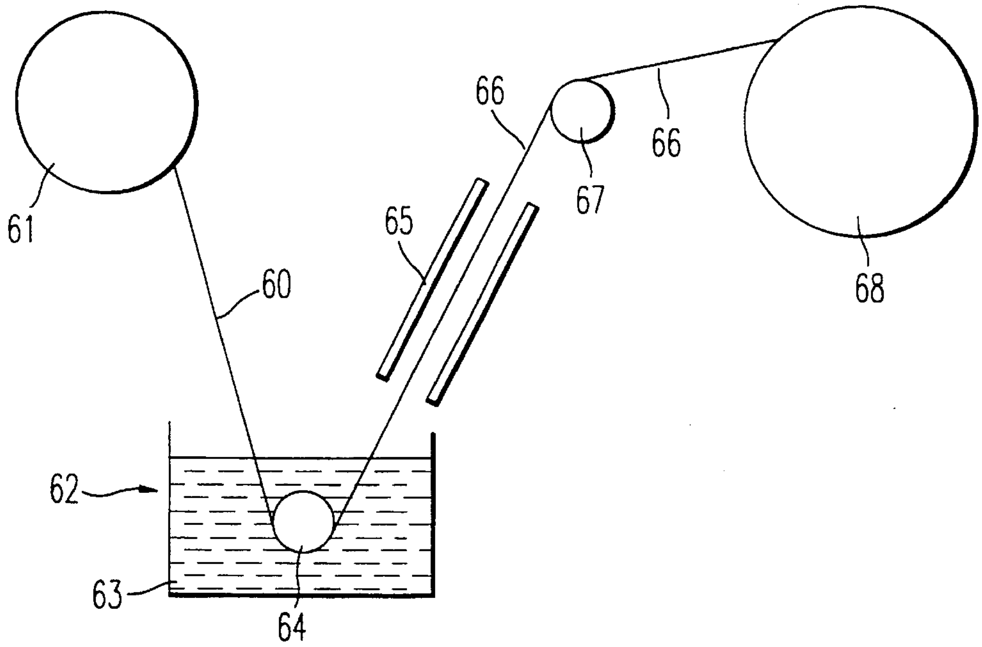
FIG. 2 illustrates diagrammatically the steps of coating and winding a fibre in forming the fibre preforms; and, FIG. 3 is a cross-sectional view through part of the preform winding former shown in FIG. 2.

Referring now to FIG. 2 illustrating the manufacture of a fibre preform 12A, a reinforcing fibre 60 is drawn from a feed bobbin 61, dips into a tank 62 containing a bath 63 of liquid organic binder, passes over a direction-changing pulley 64 immersed in the bath 63, and issues therefrom coated with a certain quantity of binder solution. The fibre 66 then passes through drying means 65, for example a tube heated by an electrical resistance, in order to harden the organic binder coating sufficiently while remaining capable of sticking to adjacent fibres during the subsequent winding stage. The coated fibre 66 then passes over a direction-changing pulley 67 and is wound on a former 68 to form the fibre preform 12A. In this process the coating thickness is determined by the viscosity and, therefore, the concentration and temperature of the solution 63, while its drying and, therefore, its hardness are determined by the intensity of the heating in the tube 65 and the dwell time of the fibre therein.

Figure 3:
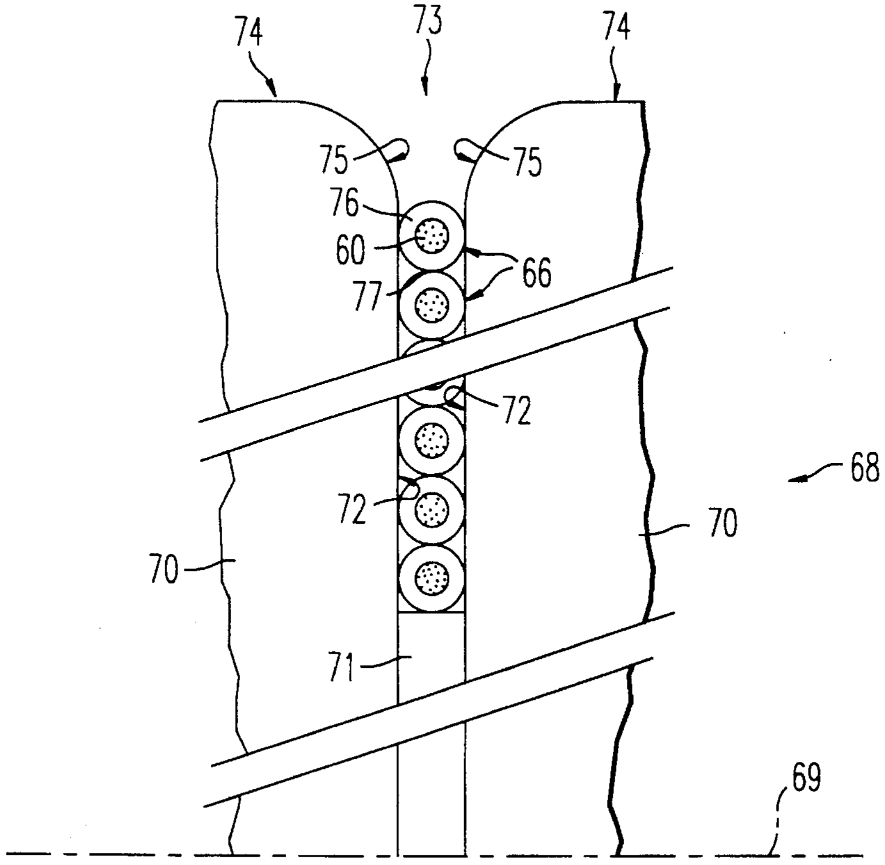

FIG. 3 shows the former 68 in more detail, it having two circular cheeks 70 disposed on opposite sides of a circular hub 71, and means (not shown) for positioning and rotating the cheeks 70 and the hub 71 around a rotational axis 69. Each of the two cheeks 70 has a flat radial lateral surface 72 facing the other to bound an annular groove 73 opening at the periphery 74 of the former 68 and defined internally by the hub 71. The surfaces 72 each merge with the periphery 74 of the former 68 through a radiussed part 75 in order to avoid any risk of dislodging the coating 76 of the fibre 60.

The coated fibre 66 is wound spirally in the groove 73 to form the fibre preform 12A, the between-turns gap being equal to twice the thickness of the fibre coating 76. The separation between the surfaces 72 is equal to or slightly greater than the diameter of the coated fibre 66, and the diameter of the hub 71 is equal to the internal diameter of the required fibre preform 12A.

Preferably, one of the cheeks 70 is detachable from the hub 71 for ease of removal of the wound preform 12A, and the hub 71 has a frusto-conical shape whose minor diameter is nearer the detachable cheek 70 to facilitate removal of the preform 12A. The surfaces 72 and the periphery of the hub 71 are preferably made of a hard non-stick material such as Teflon (polytetrafluoroethylene).

The coating 76 must be dried sufficiently to become hard enough not to be deformed significantly during winding, but must not be overhardened. The tension of the fibre 66 during winding on the former 68 therefore causes adjacent turns of coated fibre 66 to stick together along the between-turns contact line 77. This sticking ensures cohesion of the preform during its removal from the former, its transportation and its placement into the annular groove 8 of the rotor blank 3.

The concentration and temperature of the organic binder bath 63, the heating of the coated fibre 66 and the tension thereof can be determined by experiments which will be familiar to a person skilled in the art. In the present embodiment the bath 63 is a solution of polymethylmethacrylate having the general chemical formula $(CH_2C(CH_3)(CO_2CH_3)–)n$ (conventionally called PMMA) in acetone. PMMA is pyrolysable between 400° C. and 600° C.

Consequently, during heating of the rotor 1 before the isothermal forging step a dwell of from approximately 1 to 2 hours at 500° C. is allowed to pyrolyse the binder and eliminate the pyrolysis induced gases.

The stack of the fibre preforms 12A and filler metal discs 12B is relatively compact. Consequently, and to facilitate removal of the gases produced by pyrolysis of the binder it is preferable to pierce the metal discs 12B separating the fibre preforms 12A. In order not to alter the respective proportions of fibre and metal and not to risk the fibres of two adjacent preforms 12A contacting one another through the perforations in the discs 12B, such perforations are preferably made without removal of material, for example by means of a metal point or a blade.

We claim:

1. A method of producing a circular, fibre-reinforced metal article, comprising the steps of:

making a metal blank of said article;

forming at least one annular groove in said blank, said annular groove having an axis and being open at least in the direction of said axis;

making preforms of fibre and filler metal;

placing said preforms into said annular groove; and isothermally forging said blank and said preforms to produce the said article in a single isothermal forging step wherein said preforms are compressed, the compressed preforms are welded to the blank, and the article is shaped.

2. A method according to claim 1, wherein spaces remaining between said preforms and the walls of said annular groove when said preforms are placed in said groove are filled with powder weldable to the metal of said blank and said filler metal.

3. A method according to claim 2, wherein said powder and said filler metal have isothermal forging temperatures near or below that of the metal of said blank.

4. A method according to claim 1, including the additional steps of:

providing a plug for said annular groove; and closing said groove with said plug after said step of placing said preform into said groove and before said isothermal forging step.

5. A method according to claim 4, wherein said plug makes contact with said preforms in said groove when closing said groove, and said plug is made of a metal having an isothermal forging temperature near or above that of said filler metal so that the compression of said preforms precedes the isothermal forging and shaping of the article.

6. A method according to claim 1, wherein said isothermal forging step is performed in a press in a direction parallel to the geometric axis of said circular article to be produced.

7. A method according to claim 6, wherein the metal of the article is extruded radially on at least one side of said article during said isothermal forging step in order to further increase the strength of said article.

8. A method according to claim 1, including the further step of subjecting the article to a centrifugal pressure during said isothermal forging step.

9. A method according to claim 8, including the further step of placing a band having a low coefficient of thermal expansion around said blank before said isothermal forging step so as to prevent stressing of said preform fibres during said isothermal forging step.

10. A method according to claim 1, wherein said step of making preforms provides fibre preforms and filler metal preforms which are separate from each other, said fibre preforms and said filler metal preforms each having the shape of a flat ring, and wherein said step of placing said preforms in said annular groove comprises stacking said fibre preforms and said filler metal preforms alternately in the groove so that each metal preform separates two fibre preforms.

11. A method according to claim 10, wherein said filler metal preforms are pierced without loss of material therefrom.

12. A method according to claim 10, wherein the making of said fibre preforms includes the steps of:

coating a fibre with a layer of binder; and winding the coated fibre on a former.

13. A method according to claim 12, wherein said coated fibre is wound on said former in a single flat radial layer.

14. A method according to claim 12, wherein said fibre is coated by dipping the fibre in an organic binder solution and then drying the coated fibre.

15. A method according to claim 14, wherein said binder solution comprises polymethylmethacrylate having the chemical formula $(CH_2C(CH_3)(CO_2CH_3)\text{–})n$ dissolved in acetone.

* * * * *